E. H. ROLLINS.
MACHINES FOR MAKING WOOD GUTTERS.

No. 176,892. Patented May 2, 1876.

WITNESSES:

INVENTOR:

BY

ATTORNEYS

UNITED STATES PATENT OFFICE.

EDMUND H. ROLLINS, OF BANGOR, MAINE.

IMPROVEMENT IN MACHINES FOR MAKING WOOD GUTTERS.

Specification forming part of Letters Patent No. 176,892, dated May 2, 1876; application filed February 28, 1874.

*To all whom it may concern:*

Be it known that I, EDMUND H. ROLLINS, of Bangor, in the county of Penobscot and State of Maine, have invented a new and Improved Machine for Making Wood Gutters, of which the following is a specification:

The invention will first be fully described, and then pointed out in the claim.

Figure 1:
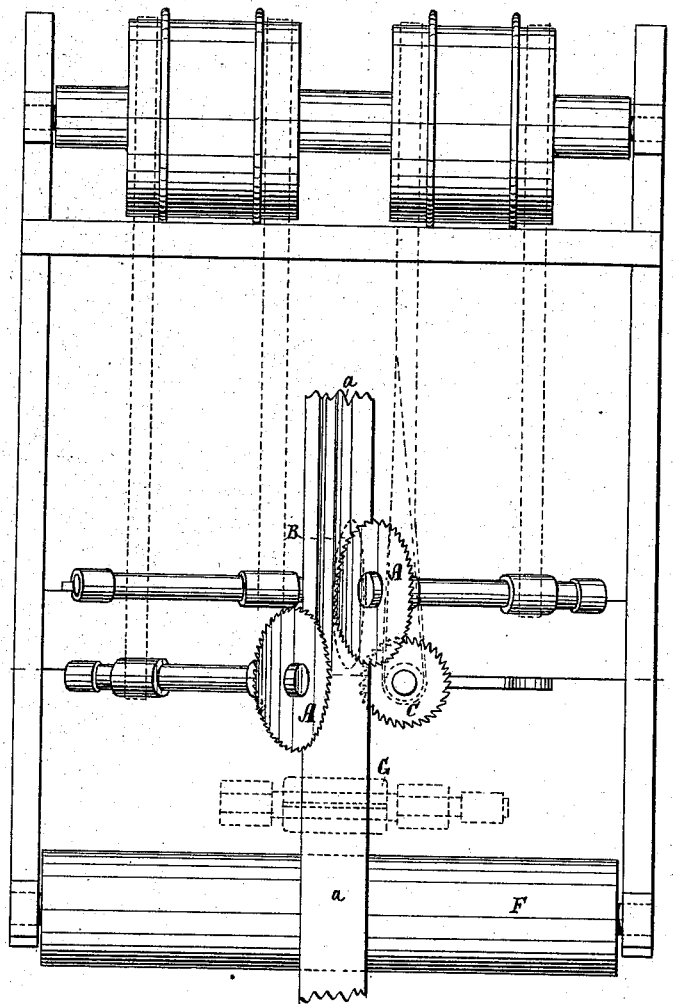
Figure 2:
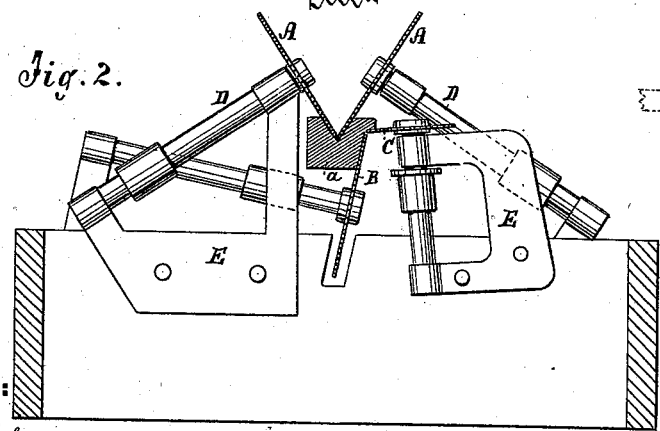
Figure 3:
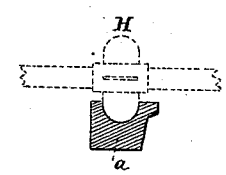

Figure 1 is a plan view of my improved machine. Fig. 2 is an end elevation; and Fig. 3 is a detail, showing the form of tool that will be used for finishing the groove.

Similar letters of reference indicate corresponding parts.

A represents the rotary saws for cutting the groove in the upper side of the timber $a$, and B and C the saws for cutting off the timber, which it is required to remove from the front preparatory to planing the molding on it.

The saws B are arranged to cut a V-groove about the shape of a right angle, or a little less, being mounted on arbors D, suitably inclined on their supports E for the purpose. The saw B is nearly vertical, while the saw C is horizontal, or nearly so, corresponding to the shape it is desired to produce on the front of the timber.

In practice, the supports E, and also the supports for the saws B and C, will be mounted so as to be shifted or adjusted readily for varying their angles, and to adapt them for gutters of different sizes.

F represents one of the feed-rollers that will be used for feeding the timber, and G represents the surfacing-cutter in dotted lines.

In Fig. 3, H is the grooving-cutter that will be used for completing the groove in the gutter. It is shaped so as to make the groove in oval form on the bottom with nearly vertical sides, showing that by this method of making the groove by first roughing it out by the saws A it can be made with an oval bottom deeper for a given width of timber than it can be when a barrel-saw is used for sawing out the groove, which is a form more desirable than that of equal width and depth produced by the barrel-saw.

Having thus described my invention, I claim as new and desire to secure by Letters Patent—

A machine for making wooden gutters, consisting of a series of saws, A A B C, placed upon the ends of shafts arranged in supports E, substantially as shown and described.

EDMUND H. ROLLINS.

Witnesses:
A. P. THAYER,
T. B. MOSHER.